(12) United States Patent
Kirkby

(10) Patent No.: US 8,223,852 B2
(45) Date of Patent: Jul. 17, 2012

(54) MULTICARRIER MODULATION

(75) Inventor: Robert H Kirkby, Lincoln (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 2357 days.

(21) Appl. No.: 10/495,622

(22) PCT Filed: Dec. 5, 2002

(86) PCT No.: PCT/GB02/05501
§ 371 (c)(1),
(2), (4) Date: May 14, 2004

(87) PCT Pub. No.: WO03/049396
PCT Pub. Date: Jun. 12, 2003

(65) Prior Publication Data
US 2005/0084024 A1   Apr. 21, 2005

(30) Foreign Application Priority Data
Dec. 7, 2001   (EP) .................................... 01310258

(51) Int. Cl.
*H04K 1/10* (2006.01)
(52) U.S. Cl. ........................................ 375/260; 375/259
(58) Field of Classification Search ................... 375/260
See application file for complete search history.

(56) References Cited

U.S. PATENT DOCUMENTS
6,035,000 A   3/2000   Bingham
6,044,482 A   3/2000   Wong
2002/0159507 A1 * 10/2002   Flaig et al. ................. 375/148

FOREIGN PATENT DOCUMENTS

| EP | 1 154 607 | 11/2001 |
|----|-----------|---------|
| EP | 1154607 A1 | 11/2001 |
| EP | 1 164 758 | 12/2001 |
| EP | 1164758 A2 | 12/2001 |
| WO | WO 87/06368 | 10/1987 |
| WO | WO 97/40587 | 10/1997 |
| WO | WO 97/40608 | 10/1997 |
| WO | WO 01/95580 | 12/2001 |
| WO | WO 01/95580 A2 | 12/2001 |
| WO | WO 02/23844 | 3/2002 |
| WO | WO 02/23844 A2 | 3/2002 |

OTHER PUBLICATIONS

Bingham, "RFI Suppression in Multicarrier Transmission Systems", IEEE Vehicular Technology Conference, May 4-7, 1997, pp. 1026-1030, XP000741584.

(Continued)

*Primary Examiner* — Shuwang Liu
*Assistant Examiner* — Michael Neff
(74) *Attorney, Agent, or Firm* — Nixon & Vanderhye P.C.

(57) ABSTRACT

Signals are transmitted on sub-channels at different but mutually overlapping frequencies. A receiver separates the sub-channels into component signals $Z_0 \ldots C_{254}$ Prior to decoding (7), interference estimates $C_0 \ldots C_{254}$ are subtracted from the components. These estimates are deduced from the signals received on the idle sub-channels (or on sub-channels from which a known or estimated signal is subtracted), for example by calculating (10) parameters defining a model of the interference and using these (11) to generate the interference estimates.

33 Claims, 6 Drawing Sheets

OTHER PUBLICATIONS

Byung-Jang et al., "Digital RFI Canceller for DMT based VDSL", Electronics Letters, vol. 34, No. 17, Aug. 20, 1998, pp. 1640-1641, XP000853264.

Bury, "Block Transmission Equalizers using Constrained Minimum Variance Filters with Application to MC-CDM", IEEE International Symposium on Spread Spectrum Techniques and Applications, Sep. 6-8, 2000, pp. 159-163, XP002197713.

Yoshino et al., "Adaptive co-Channel Interference (CCI), Cancellation for OFDM Communication Systems", International Zurich Seminar on Broadband Communications, Feb. 15-17, 2000, pp. 245-250, XP000931245.

Fazel, "Narrow-band Interference Rejection in Orthogonal Multi-Carrier Spread-Spectrum Communications", IEEE Conference on Universal Personal Communications, Sep. 27, 1994, pp. 46-50, XP01013155.

Cheong et al, "Coexistence of 1 Mbps HPNA and DMT VDSL via Multiuser Detection and Code Division Multiplexing . (99-120)", ANSI Contribution T1E1.4/99-120.

ETSI TM6 paper "Protectoin of Local AM Stations by Digital Notching", Feb. 12-16, 2001.

International Search Report.

European Search Report.

Jeong et al, "Digital RFI canceller for DMT based VDSL", Electronics Letters, vol. 34, No. 17, Aug. 20, 1998, pp. 1640-1641.

Bingham, "RFI suppression in multicarrier transmission systems", IEEE Vehicular Technology Conference, May 4-7, 1997, pp. 1026-1030.

Fazel, "Narrow-band interference rejection in orthogonal multi-carrier spread-spectrum communications", IEEE Conference on Universal Personal Communications, Sep. 27, 1994-Oct. 1, 1994, pp. 46-50.

Bury et al, "Block transmission equalizers using constrained minimum variance filters with application to MC-CDM", IEEE International Symposium on Spread Spectrum Techniques and Applications, Sep. 6-8, 2000, pp. 159-163.

Yoshino et al, "Adaptive co-channel interference (CCI) cancellation for OFDM communication system", International Zurich Seminar on Broadband Communications, Feb. 15-17, 2000, pp. 245-250.

* cited by examiner

MULTICARRIER MODULATION

This application is the US national phase of international application PCT/GB02/05501 filed 5 Dec. 2002 which designated the U.S. and claims benefit of EP 01310258.7, dated 7 Dec. 2001, the entire content of which is hereby incorporated by reference.

FIELD OF TECHNOLOGY

This application is concerned with multicarrier modulation techniques, which serve to transport information over a communications channel by modulating the information on a number of carriers, typically known as sub-channels.

BACKGROUND AND SUMMARY

Of particular interest are discrete systems where, rather than modulating a carrier with a continuously variable information signal, successive time periods ("symbols") of the carrier each serve to transmit one piece of information; that is, the modulated information does not vary during the course of a symbol.

Of the most practical interest is the situation where the information to be sent is in digital form, so that each symbol serves to transport a number of bits, but this is not in principle necessary and sampled analogue signal could be sent i.e. the information signal is quantised in time but may or may not be quantised in amplitude.

Quadrature modulation may if desired be used, where both the phase and amplitude of the carrier are varied, or (which amounts to the same thing) two carriers at the same frequency but in phase quadrature may each be modulated independently. A "multicarrier symbol" may thus consist of a time period during which are transmitted (say) 256 carriers at different frequencies plus 256 carriers at the same set of frequencies but in phase quadrature. For digital transmission, up to 512 groups of bits may be modulated onto these carriers. Normally the carriers are harmonically related, being integer multiples of the symbol rate (though in systems using a "cyclic prefix" the symbol rate is slightly lower than this statement implies). This form of modulation is particularly attractive for use on poor quality transmission paths, since the number of bits allocated to each carrier can be tailored to the characteristics of the path, and indeed carriers may be omitted in parts of the frequency spectrum in which quality is especially poor.

The number of bits sent on each sub-channel may if desired be varied depending on the signal and noise levels in each sub-channel. This can be a particular advantage for transmission paths which suffer crosstalk or radio frequency interference, since the system can adapt automatically to avoid regions of frequency spectrum that are unsuitable for data transmission. The number of bits sent on each sub-channel may if desired be varied adaptively depending on the signal and noise levels in each sub-channel as observed from time to time. This can be a particular advantage for transmission paths which vary significantly over the course of a communication.

Multicarrier modulation has been standardised for use on copper pair links in a form known as discrete multitone (DMT) modulation. This is described in an ANSI standard (T1.413-1998) for asymmetrical digital subscriber loop technology and also a European standard [DTR/TM-03050] and an international standard [ITU G.adsl].

A modulator for multicarrier systems may be constructed with a bank of oscillators at the respective frequencies, each followed by a modulator, whilst a receiver might consist of a bank of synchronous demodulators each driven by an oscillator synchronised to the corresponding oscillator at the transmitting end. In practice, however, a more popular approach is to regard the data values to be transmitted for a given symbol as Fourier coefficients and to generate the modulated signal by means of an inverse Fourier transform. Similarly the demodulator would apply a Fourier transform to the received signal in order to recover the transmitted carrier phase and amplitude (or in-phase and quadrature components) which can then be decoded using standard quadrature amplitude modulation (QAM) techniques. Such a demodulator, as envisaged by the above-mentioned ANSI standard, is shown in FIG. 1. The received signal is filtered by a filter 1, and converted into digital form in an analogue- to digital converter 2. The digitised samples are entered into a buffer 3, synchronisation being provided by a control unit 4 so that, for each symbol, a block of 512 samples is assembled in the buffer. These are then supplied to a discrete Fourier transform unit 5 which processes the samples to recover complex values $z_j$ (j=0 ... 254) representing the transmitted carrier (plus of course, noise), output as in-phase and quadrature components $I_j$, $Q_j$ (that is, $z_j = I_j + iQ_j$). These are scaled at 6, each $z_j$ being multiplied by a complex number to compensate for delay and attenuation suffered by the relevant carrier, and then fed to a QAM decoder 7 (usually employing some form of convolutional code and a soft-decision decoder), whereby the desired data values are recovered.

One of the functions of the control unit 4, in addition to synchronisation, is to engage, at start-up, in a training sequence, that is, a dialogue with the transmitting modulator in which it obtains the information it needs about the transmitted signal, for example, which sub-channels are actually in use, how many bits are carried by each sub-channel, and what QAM constellations are being used by the modulator. In some systems, these parameters may be changed dynamically by further negotiation between the two ends during actual transmission. It is noted that the timing output from the control unit 4 serves for synchronisation of the various parts, whilst the control output indicates which sub-channels, and which constellations, are currently in use.

The invention is defined in the claims.

BRIEF DESCRIPTION OF THE DRAWINGS

Some embodiments of the invention will now be described, by way of example, with reference to the accompanying drawings, in which.

DETAILED DESCRIPTION

The general aim of the receiver now to be described is based on the observation that, where a sub-channel has, owing to the presence of interference, been taken out of use, the signals received on that sub-channel will consist only of some component of the interfering signal, along with additive white Gaussian noise. Consequently it aims to deduce from the signals received on the idle sub-channel some knowledge about the nature of the interfering signal and use this knowledge to apply a correction to the signals received on the other sub-channels. Sub-channels in which the transmitted signal is known (e.g. pilot tones) can also be used in the same way if the known component is firstly subtracted. Sub-channels carrying data can also be used in the same way if the signal component is firstly estimated and subtracted.

Figure 1:
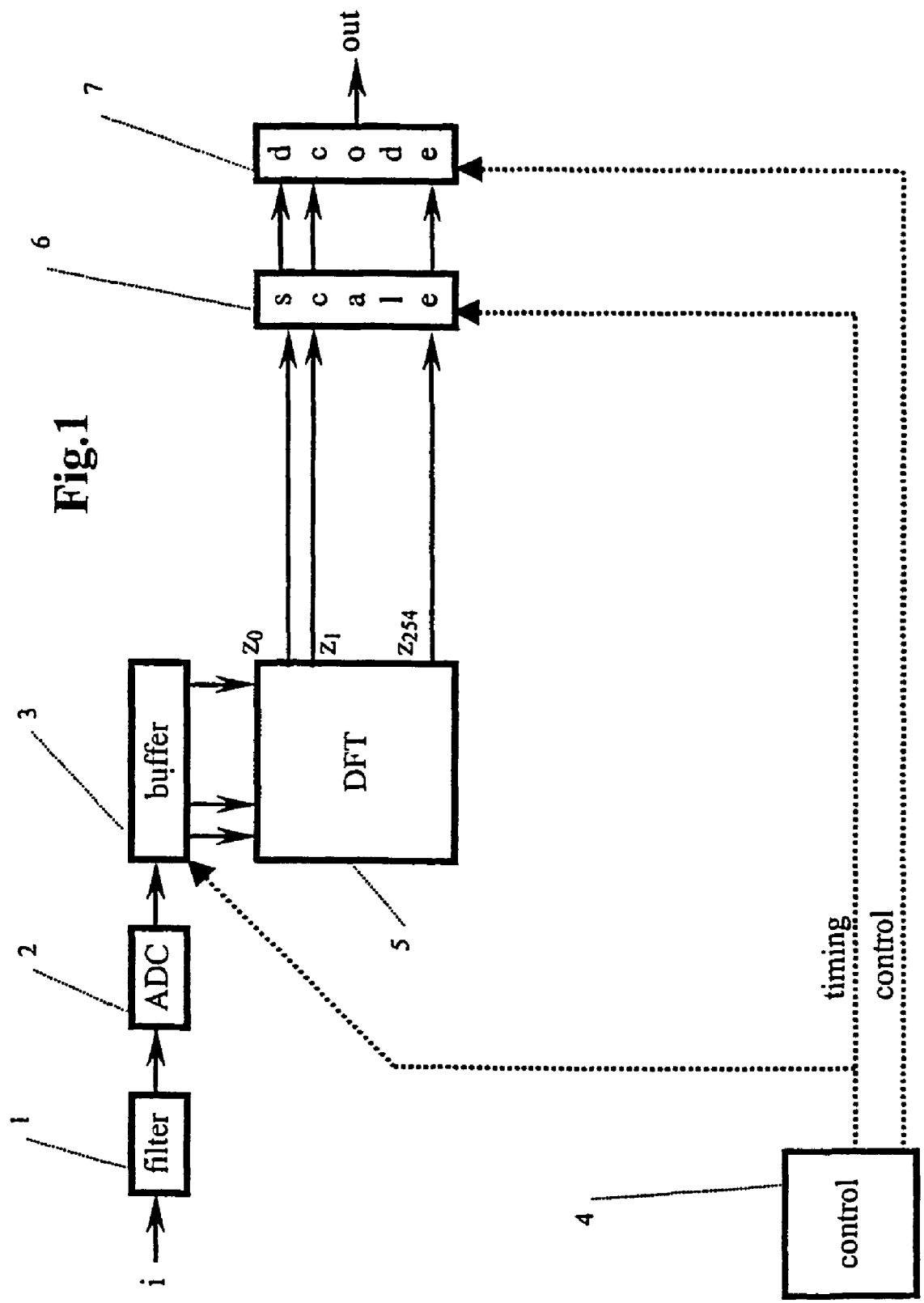
FIG. 1 is a block diagram of a known form of receiver.
Figure 2:
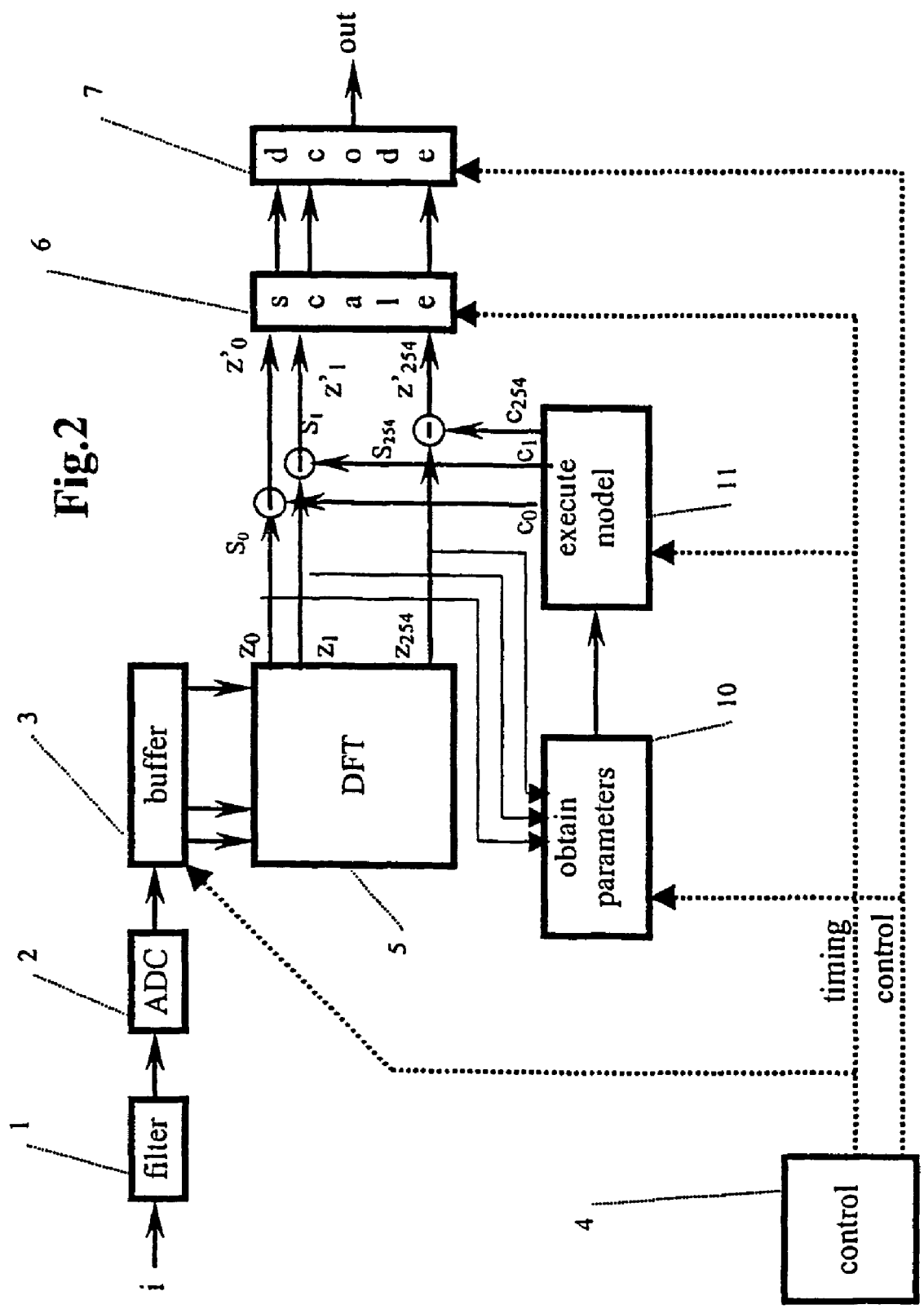
FIG. 2 is a block diagram of one example of receiver according to the invention.

Thus the receiver shown in FIG. 2 has the same general structure as that of FIG. 1 but additionally has interference cancellation units 10, 11 which receive the values $z_j$ from the DFT unit 5, and information from the control unit 4 indicating which sub-channels are idle. They calculate corrections $c_j$ to be made and subtract these from the $z_j$ values in subtractors $S_j$ to form corrected values $z_j'$ which are supplied to the scaling unit 6 and further processed as already described.

Of course, the idea that the received signal on an idle sub-channel can allow one to infer something about the interference on some other sub-channel implies a correlation between the interference on the two channels. It follow that it is not possible to compensate for true white noise. Conceptually, at least, the idea involves the notion of a model of the interfering signal. The simplest such model is a pure sinusoid which is completely characterised by three real numbers, the most natural choice being its frequency F, phase $\phi$ and amplitude A:

$$f(t) = A \cdot \cos(2\pi F t + \phi) \quad (1)$$

This could for example represent the constant carrier portion of ingress from an AM radio transmitter. In case it should be supposed that such a sinusoid would affect only one sub-channel, it is pointed out that, in practice, the sub-channels occupy overlapping portions of frequency spectrum. Such a sinusoid will affect all sub-channels to some extent, unless its frequency is exactly the carrier frequency of one sub-channel (in which special case it affects only that one sub-channel).

An example of a more complex model might be one where the interfering signal is the sum of two or more such sinusoids.

Taking this model as an example, the cancellation comprises the following steps:

(a) determine the expected contribution of the assumed interfering signal to the received signal $z_j$ in the idle sub-channels;

(b) compare these with the actual signals $z_j$ in respect of the idle sub-channels to estimate values for the model parameters;

(c) use these parameters to calculate the contributions $c_j$ of the assumed interference in the sub-channels actually in use;

(d) subtract $c_j$ from the $z_j$ values.

Steps (a) and (b) are performed by the parameter estimation unit 10, which is connected to receive the values $z_j$ from the DFT unit 5, and to the control unit 4 from which it receives signals indicating which channels are not in use. Such signals are of course present in a conventional decoder.

The expected signal $z_k''$ on sub-channel k due to the interfering signal f(t) is simply the output that the DFT unit 5 would produce when supplied with the signal f(t). In analytical form this is $$z_k'' = \frac{1}{\tau} \int_{-\tau/2}^{\tau/2} f(t) \cdot \exp\left(\frac{-2ik\pi t}{\tau}\right) dt \quad (2)$$

Substituting for f(t) from Equation (1) and integrating, we obtain:

$$z_k'' = \frac{A}{2}((\exp(i\varphi)\operatorname{sinc}(\tau F - k) + \exp(-i\varphi)\operatorname{sinc}(\tau F + k)) \quad (3)$$

where $\phi$ is the symbol period and the time origin t=0 corresponds to the middle (or other fixed position) of the block used by the receiver.

The model parameters are estimated so as to minimise the error using a least mean squares (LMS) approach, this error being the square of the difference between the predicted signal and the actual one. We prefer to normalise this by division by the time-average of the difference over some recent time-period T:

$$e = \frac{\sum_k |z_k'' + p_k - z_k|^2}{\frac{1}{T}\sum_t |z_k'' + p_k - z_k|^2} \quad (4)$$

the summation being for all values of k corresponding to idle sub-channels, and where $p_k$ is the known signal value (zero for idle subchannels). e is then differentiated with respect to the model parameters, to find those parameters which bring the derivatives to zero. Sometimes this can be performed analytically, using a programmed method, to solve it once for each symbol. However, better results may be achieved my making small adjustment over many symbol periods, for example using the well-known "steepest descent" method, though any other minimisation method can be used (e.g. the Widrow-Hoff method). Thus one takes the parameters determined for the preceding symbol and adjusts them to provide a reduction in the error e for the new symbol, but subject to a limit on the amount by which the parameters are permitted to change, so that the estimate is gradually improved (and tracks changes in conditions) yet is not unduly affected by short-term variations of a kind which cannot be modelled—for example in the case of audio signals modulated on a RF carrier, it would be relatively easy to model the carrier but rather more difficult to model the modulation. These limits should be selected on the basis of the expected characteristics of the source of interference, so that for example an interfering RF transmitter may be expected to have a stable frequency, thereby implying a small limit (and hence slow adaptation), whereas its amplitude might vary and imply therefore a relatively large limit, so that more rapid changes can be tracked. In practice this process can be implemented using a suitably programmed digital signal processing (DSP) chip. Step (c) is performed by the model execution unit 11.

Here, the estimated contribution Cm of the interference model to the received $z_j$ for the sub-channels in use is again the output that the DFT unit 5 would produce when supplied with the signal f(t) having the parameters just determined, and this can be calculated as indicated above or by using a DFT. Obviously there is no need to calculate $c_m$ for the idle sub-channels. Also, the value of the information in a given idle sub-channel in estimating corrections for an in-use sub-channel diminishes the further away (in terms of frequency) the in-use sub-channel is from the idle sub-channel. Consequently one might choose to reduce the amount of computation by omitting to calculate $c_m$ for in-use sub-channels which are more than a certain number of channels away from the nearest idle sub-channel. Indeed this is desirable since applying corrections for subchannels where interference either is absent or is uncorrelated with the information available in the idle sub-channels will produce no benefit and may be disadvantageous in increasing the amount of Gaussian noise.

The above example assumes a single sinusoid model with three parameters, i.e. three degrees of freedom. It is necessary that the number of pieces of information used to estimate the parameters be at least equal to this number, and preferably exceed it, in order to permit a reasonably accurate estimate to be made. It follows therefore that there must be at least two idle sub-channels thereby providing two values $z_i$ each having in-phase and quadrature components. In practice as many as six or seven subcarriers may be turned off in the vicinity of interference, thus providing a substantial amount of information. More complex models might of course be used: for example one might choose a model consisting of two (or more) sinusoids, provided that there is a sufficient number of idle sub-channels.

The previous examples estimated the nature of the interference by reference to the signals received in the idle sub-channels. In a modified version one uses also
(a) signals received in sub-channels whose content is known, for example a pilot tone. In this case the known content must be subtracted from the signal before it can be used for estimating the model.
(b) signals received in sub-channels carrying data, if the sub-channel can be demodulated, and the effect of the data subtracted.

An initial coarse estimate of where interferers are would be a useful source of initialisation for the model proper, speeding up initial convergence a lot. For a multiple sinusoids model, if the real noise components are in different parts of the band it is conceivable that they could be treated independently.

A possibility that may arise with the systems described is that the resulting improvement in error rate may make it possible that sub-channels formerly rendered idle due to interference may become usable again. Conventional mechanisms as used for adaptive allocation of sub-channels can be used. These involve the sending of test signals on the idle sub-channel so that its current quality may be assessed. Where this occurs, the receiver, upon being warned of the impending test signal, must (in idle-only correction) cease to monitor the sub-channel for interference, or (otherwise) subtract the test signal before using the received signal for interference correction control. The same applied when the idle sub-channel ceases to be idle.

Figure 3:
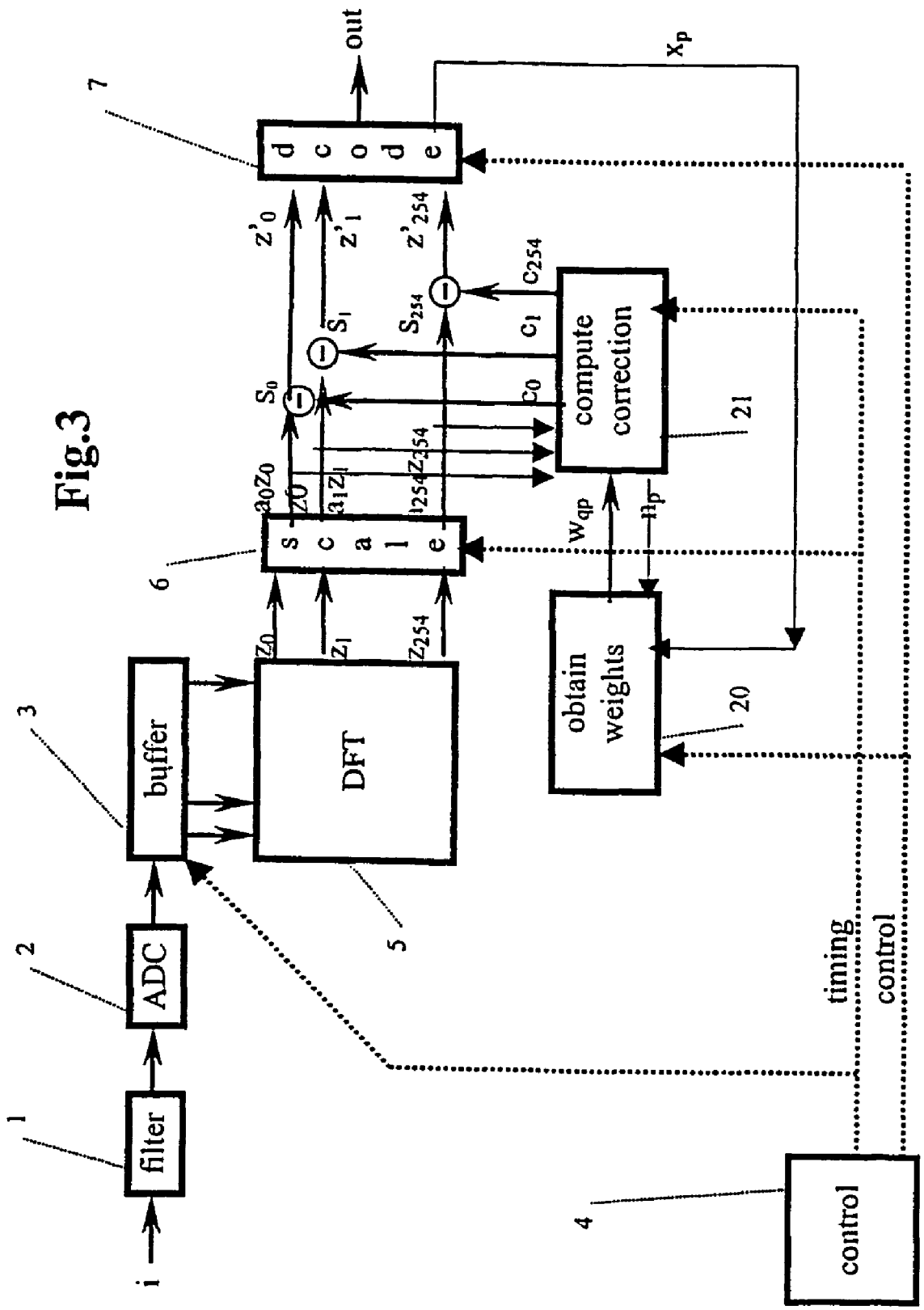
FIG. 3 is a block diagram of another example of receiver according to the invention.

FIG. 3 shows another form of receiver, again with the same basic structure as in FIG. 1. An interference cancellation unit 21 calculates corrections $c_p$ to be made, and these are subtracted in subtractors $S_p$ from the sub-channel values. In this instance the correction occurs after the scaling unit 5 so that the corrected value is $$a_p z_p - c_p \qquad (5)$$

where $a_p$ is the relevant scale factor.

The correction $c_p$ is a weighted sum of the scaled sub-channel values $a_p z_p$ for the idle sub-channels.

$$c_p = \sum_q a_q z_q w_{qp} \qquad (6)$$

Figure 4:
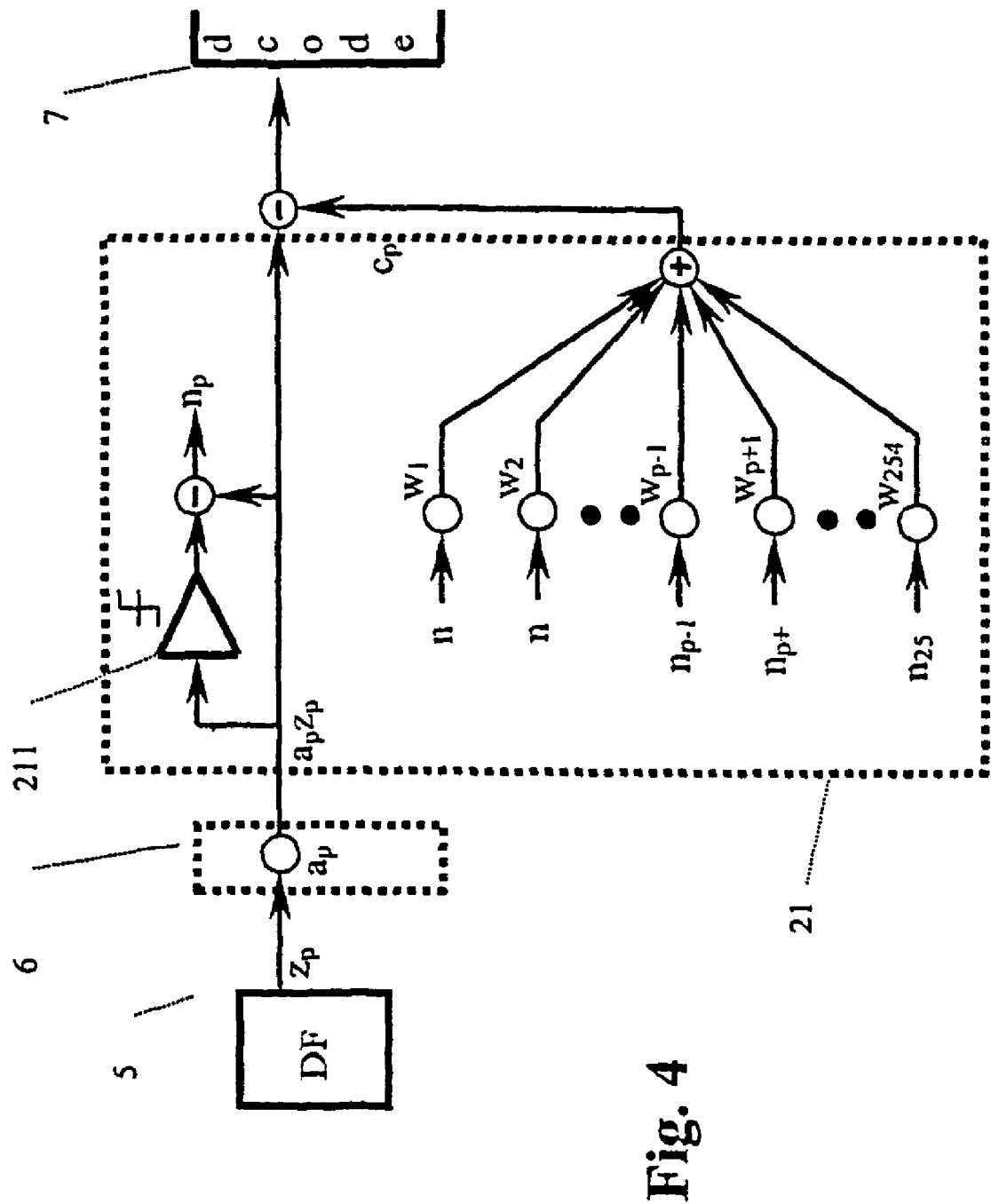
FIGS. 4 and 5 show details of parts of the receiver of FIG. 3.
Figure 5:
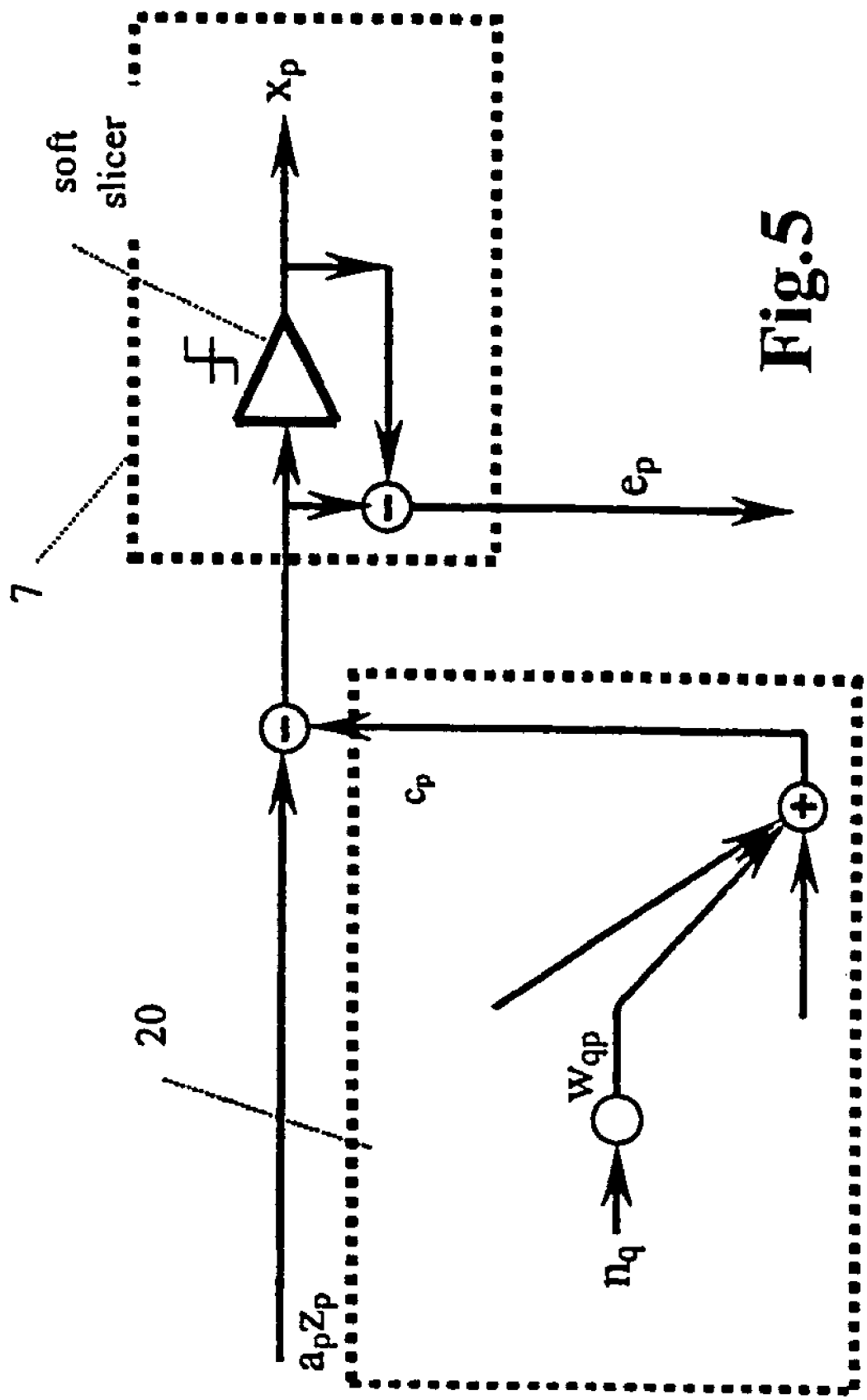

If however it is desired to make use also of the predictable or estimable sub-channels, then the noise element of the received sub-channel is estimated as $$n_q = a_q z_q - \theta_q \qquad (7)$$

where $\theta_q$ is the estimated data content for a data-carrying sub-channel—for example, in a QAM system, the (complex) coordinate of that point of the QAM constellation which has the smallest Euclidean distance from the (complex) value represented by $a_q z_q$. This is indicated in FIG. 4 by a hard slicer 211. The same method may be used for determining $\theta_q$ for an idle or predictable sub-channel, but it is probably preferable to force $\theta_q$ to zero (or the known expected value) in such cases.

It may be possible to use a soft decision in the slicer 211, on the lines of that taking place in the decoder 7, though probably this will give small benefit at the expense of greater complexity.

Thus the correction becomes $$c_p = \sum_{\text{all } q \neq p} n_q w_{qp} \qquad (8)$$

Computing the correction $c_p$ using all the sub-channels $q \neq p$ (254 in this example) is computationally onerous and, on the basis (as noted earlier) that the value of the received signals for correction diminishes the further infrequency one moves from sub-channel p, one may prefer to use only a limited number within a range $\pm\Delta$, e.g.

$$c_p = \sum_{q=p-\Delta}^{p-1} n_q w_{qp} + \sum_{q=p+1}^{p+\Delta} n_q w_{qp} \qquad (9)$$

(truncation at the limits is expressed by defining $w_{qp}=0$ for $q<0$ or $q>254$, though out-of-band information could also be made use of if desired.).

In a simple version of this system, the weighting factors $w_{qp}$ may simply be fixed. For example, a version obtaining a correction only from one neighbouring sub-channel could use a weight of 1+i0.

We prefer, however to calculate the weighting factors taking into account the characteristics of the signals actually received. One method of doing this will now be described.

The weighting factors $w_{pq}$ can be evaluated using the well-known "steepest descent" method. This procedure—which is the same whether all $q \neq p$ or only some values of q are used—is performed using error values from the decoder 7. This is a soft-decision decoder typically using a Viterbi algorithm to decode convolutionally-coded data. The resultant decision for a particular sub-channel p is denoted by $x_p$ and illustrated by soft slicers 71. Note that $x_p$ is the complex co-ordinate of the QAM constellation value, not the actual data. An error signal $e_p$ is the difference between the input and this decision, that is $$e_p = a_p z_p - c_p - x_p \qquad (10)$$

This value is routinely produced for data and tone-bearing sub-channels in real receivers as it also used for maintaining synchronisation: thus the decoder 7 can be a conventional decoder. If $e_p$ should be required for an idle sub-channel (e.g. for calculating weights $w_{pq}$ prior to bringing the sub-channel back into service) $x_p$ can be forced to zero.

The calculation of the weighting factors is shown as performed in the unit 22. The aim is to minimise the average $|e_p|^2$. The following analysis works by considering $|e_p|^2$ as a function of all the real parameters (so the real and imaginary parts of $w_{qp}$ are considered separately), estimating the direction of steepest descent, and taking a small step downhill $$\text{Let } w_{qp} = u_{qp} + i \cdot v_{qp} \ (u, v \text{ real}: i^2 = -1). \qquad (11)$$

$$\text{So } e_p = a_p z_p - \sum_q n_q (u_{qp} + i \cdot v_{qp}) - x_p$$

Ignoring for the moment the possibility of changes in $x_p$ due to a change in $w_{qp}$, we find $$\frac{\partial e_p}{\partial u_{qp}} = -n_q \quad \frac{\partial e_p}{\partial v_{qp}} = -in_q \qquad (12)$$

-continued $$\frac{\partial |e_p|^2}{\partial u_{qp}} = \frac{\partial e_p \cdot e_p^*}{\partial u_{qp}} = (e_p \cdot (-n_q)^*) + ((-n_q) \cdot e_p^*) = 2\operatorname{Re}\{-e_p \cdot n_q^*\} \quad (13)$$

$$\frac{\partial |e_p|^2}{\partial v_{qp}} = \frac{\partial e_p \cdot e_p^*}{\partial u_{qp}} = (e_p \cdot (-i \cdot n_q)^*) + ((-i \cdot n_q) \cdot e_p^*) = 2\operatorname{Im}\{-e_p \cdot n_q^*\} \quad (14)$$

The direction of the steepest ascent is the vector of all the partial derivatives of $|e_p|^2$. Thus, for each symbol, an adjustment to the weights to be made so as to give an updated weight to be used for the next symbol given by $$u_{qp} - \mu \cdot 2\operatorname{Re}\{-e_p \cdot n_q^*\} \quad (15)$$

$$v_{qp} - \mu \cdot 2\operatorname{Im}\{-e_p \cdot n_q^*\} \quad (16)$$

where $\mu$ is a small positive constant (<<1) which controls the rate of training and may be varied from time to time but at any given time the same for all q, p.
Or, $$w_{qp}(k) = w_{qp}(k-1) + 2\mu \cdot e_p(k-1) \cdot n_q^*(k-1) \quad (17)$$

where a(k) denotes the value of a for symbol k.

Thus the task of the unit 20 is simply to calculate (once for each block) $2\mu \cdot e_p \cdot n_q^*$, add it to the current value of $w_{qp}$, and supply the new value of $w_{qp}$ to the correction unit 21. At start-up, the initial value of $w_{qp}$ can be set to zero (0+i0).

Recalling that we ignored $x_p$ in the derivation of the weights, if a notional increment $\Delta u_{qp}$ in $u_{qp}$ (or similarly for $v_{qp}$) is such as would cause a change in $x_p$, there is a discontinuity in $e_p$ and the differential coefficient is incorrect, a fact which has been ignored. Another way of viewing this simplification is by noting that the adjustments to $w_{qp}$ are such as would tend to pull the value of $a_p z_p - c_p$ closer to $x_p$. If $x_p$ is in fact wrong, this adjustment can be in the wrong direction. However, provided $x_p$ is not wrong too often, in practice $w_{qp}$ nevertheless converges to an appropriate value. The method described is robust at error rates well above those normally considered acceptable for such systems.

Mention has already been made of the possibility of using fixed weights. A method of calculating weights for this version of the invention will now be described. Unlike the preceding calculation, this method cannot rely on observed characteristics of signals recently received: rather, as discussed earlier in relation to FIG. 2, it relies on the notion of a model of the interfering signal. It is in this sense that they are fixed. They can be calculated in advance, and provided to the receiver as a look-up table, or they could be calculated from time to time by the receiver, to accommodate changes in the selection of which subchannels are and are not in use.

In this example it is taken as given that a number of contiguous sub-channels are idle, and the postulated interference is white noise of constant power spectral density over a frequency range slightly narrower than that corresponding to the idle sub-channels. In one specific example if sub-channels 54 to 61 inclusive are idle, and with guard bands of 1.6 subchahnels, the white noise would be of a constant power over the frequency range corresponding to subchannels 55.5 to 60.1.

Suppose that the noise is n(f) and (hence) the noise power spectrum is $N(f) = n^2(f)$.

This representation is of course valid for any form of the postulated noise.

The interference generated in subchannel k having centre frequency $f_k$ is termed the susceptibility of subchannel k to the interference and is given by $$S_k = \left\{ \int_{-\infty}^{+\infty} n(f) \operatorname{sinc}(f - f_k) df \right\}^2 \quad (18)$$

However, if (as here) the noise is uncorrelated, this can be simplified to $$S_k = \int_{-\infty}^{+\infty} N(f) [\operatorname{sinc}(f - f_k)]^2 df \quad (19)$$

After subtraction, the susceptibility then becomes $$S_k = \int_{-\infty}^{+\infty} N(f) \left[ \operatorname{sinc}(f - f_k) - \sum w_{mk} \cdot \operatorname{sinc}(f - f_m) \right]^2 df \quad (20)$$

where $w_{mk}$ are the weights, $f_m$ is the centre frequency of sub-channel m and the summation is performed for all idle subchannels m to be used.

The task of finding the weights is to find for each wanted subchannel k the values of $w_{km}$ that minimise $S_k$. This can conveniently be accomplished by using one of the standard minimisation methods, for example the Fletcher-Reeves-Polak-Riviere method (this and other such methods are described in Presteukolsky, Vetterling and Flannery, "Numerical Recipes in C", Cambridge University Press, 2$^{nd}$ Edition, 1992).

In a test, using the example figures given above for the postulated noise, weights w for the five adjacent subchannels on each side of the idle ones (i.e. k=49 . . . 53 and 62 . . . 66) were calculated. It was found that the RFI immunity increased by around 30 dB at a cost of increased AWGN susceptibility of about 2 dB. In more detail, the effects of the correction are shown in the following table.

| bin | RFI change | AWGN change |
| --- | --- | --- |
| 49 | −23.55 [dB] | 0.99 [dB] |
| 50 | −25.06 [dB] | 1.22 [dB] |
| 51 | −27.00 [dB] | 1.53 [dB] |
| 52 | −29.80 [dB] | 1.96 [dB] |
| 53 | −34.96 [dB] | 2.52 [dB] |
| 62 | −26.24 [dB] | 1.56 [dB] |
| 63 | −23.36 [dB] | 1.15 [dB] |
| 64 | −21.98 [dB] | 0.89 [dB] |
| 65 | −21.07 [dB] | 0.71 [dB] |
| 66 | −20.35 [dB] | 0.58 [dB] |

Figure 6:
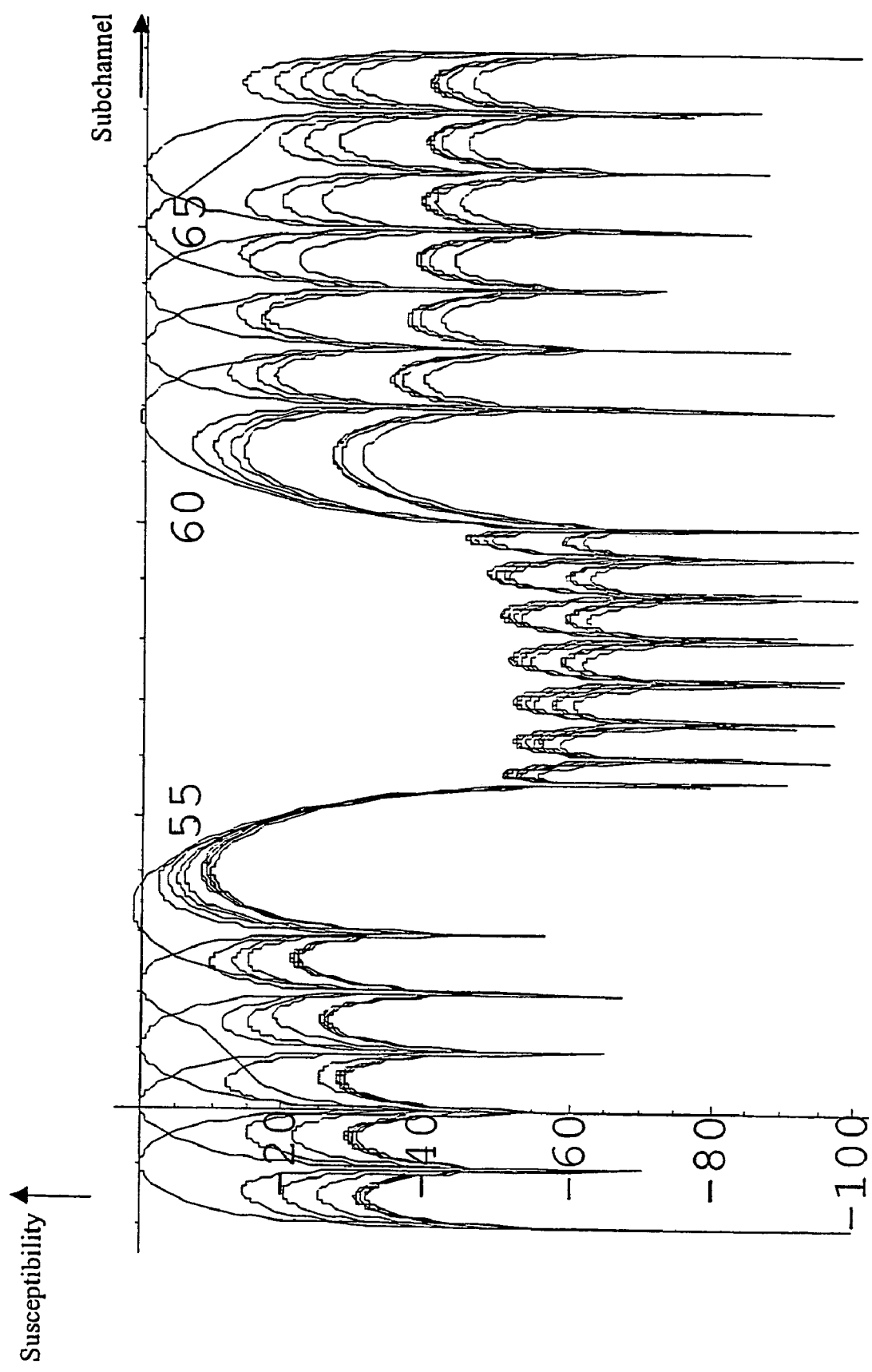
FIG. 6 is a graph showing the performance of one version of the invention.

FIG. 6 is a graph showing the susceptibility of the ten corrected subchannels, overplotted. Each bin has a main lobe roughly where its uncorrected main lobe is, and sidelobes which fall away as $1/f^2$ rather similar to the uncorrected sub-channel, but with the sidelobes in the noise band about 30 dB lower than the uncorrected subchannel.

By construction these subchannels are not affected by each others' legitimate signals; the legitimate output of the transmit end of the DMT link only contributes into a subchannel from that subchannel's proper signal and the signals in the notch subchannels—which all have zero signals.

It will of course be appreciated that a similar analysis could be performed for noise occurring in more than one idle channel region, or indeed at the regions bordering the band edges.

It should be observed that the slicers, multipliers and subtractors shown in units 10, 11, 20, 22 in the drawings are largely schematic: although the receivers could be built this way, we prefer to implement the processes we describe using a suitable programmed digital signal processing (DSP) chip. Although these units could be implemented as individual such chips, a single one could be used: indeed if desired a single DSP could be used to implement these functions along with the conventional signal processing required of such a receiver, including the FFT calculations, the equalization, the quantisation, the trellis code decoding and the synchronisation processes which keep the receiver in step with the transmitter. The same device may also be executing the dialogue with the transmitter about bit reallocation and so on.

The invention claimed is:

1. A method of receiving signals comprising a plurality of sub-channels occupying different but mutually overlapping portions of frequency spectrum, comprising:
    separating the signals into component signals corresponding to the respective sub-channels;
    calculating interference estimates for at least some of said sub-channels, based on the component signals corresponding to reference ones of said sub-channels, said reference sub-channels being one or more of (a) sub-channels bearing no transmitted data, (b) sub-channels having a fixed content which can be subtracted to obtain an interference estimate and (c) sub-channels having a content which can be estimated and subtracted to obtain an interference estimate;
    subtracting the interference estimates from the respective component signals to produce adjusted component signals;
    wherein for any particular sub-channel the interference estimate therefor is calculated as a weighted sum of interference content of the component signals of some of said reference sub-channels (excluding the particular sub-channel for which the interference estimate is to be used);
    wherein weights for said weighted sums are selected by measuring errors in the particular sub-channel and adjusting the weights in a sense such as to tend to reduce said error.

2. A method according to claim 1, for use with transmissions in which the signals in the sub-channels are allowed to assume only certain permitted values, the method including estimating, from the component signal for a given sub-channel, which of the permitted values it represents, and determining the error of the sub-channel by subtracting said estimated permitted value from the adjusted component signal for that sub-channel.

3. A method according to claim 2 in which the estimation of which permitted value a component signal represents is performed by a soft-decision decoder.

4. A method according to claim 1 including receiving signals identifying idle sub-channels, the interference content of the sub-channel being the component signal for that sub-channel.

5. A method according to claim 1 including receiving signals identifying sub-channels containing known signals, and determining the interference content of the sub-channel by subtracting said known content from the component signal for that sub-channel.

6. A method according to claim 1 for use with transmissions in which the signals in the sub-channels are allowed to assume only certain permitted values, the method including estimating, for from the component signal for a given sub-channel, which of the permitted values it represents, and determining the interference content of the sub-channel by subtracting said estimated permitted value from the component signal for that sub-channel.

7. A receiver for signals comprising a plurality of sub-channels occupying different but mutually overlapping portions of frequency spectrum, comprising:
    means for separating the signals into component signals corresponding to the respective sub-channels;
    means for calculating interference estimates for at least some of said sub-channels based on the component signals corresponding to reference ones of said sub-channels, said reference sub-channels being one or more of (a) sub-channels bearing no transmitted data, (b) sub-channels having a fixed content which can be subtracted to obtain an interference estimate and (c) sub-channels having a content which can be estimated and subtracted to obtain an interference estimate;
    means for subtracting the interference estimates from the respective component signals;
    wherein the calculating means is operable for any particular sub-channel to calculate interference estimate therefor as a weighted sum of the interference content of the component signals of some of said reference sub-channels (excluding the particular sub-channel for which the interference estimate is to be used);
    wherein the calculating means is operable for any particular sub-channel to select weights for said weighted sums by measuring errors in the particular sub-channel and adjusting the weights in a sense such as to tend to reduce said error.

8. A receiver according to claim 7, for use with transmissions in which the signals in the sub-channels are allowed to assume only certain permitted values, the calculating means includes means for estimating, from the component signal for a given sub-channel, which of the permitted values it represents, and determining the error of the sub-channel by subtracting said estimated permitted value from the adjusted component signal for that sub-channel.

9. A receiver according to claim 8 in which the permitted value estimating and error determining means is a soft-decision decoder.

10. A receiver according to claim 7 including means receiving signals identifying idle sub-channels, the interference content of the sub-channel being the component signal for that sub-channel.

11. A receiver according to claim 7 including means receiving signals identifying sub-channels containing known signals, and for determining the interference content of the sub-channel by subtracting said known content from the component signal for that sub-channel.

12. A receiver according to claim 7 for use with transmissions in which the signals in the sub-channels are allowed to assume only certain permitted values, and including means for estimating, from the component signal for a given sub-channel, which of the permitted values it represents, and determining the interference content of the sub-channel by subtracting said estimated permitted value from the component signal for that sub-channel.

13. A method of receiving signals comprising a plurality of sub-channels occupying different but mutually overlapping portions of frequency spectrum, comprising:
    separating the signals into component signals corresponding to the respective sub-channels;
    calculating interference estimates for at least some of said sub-channels based on the component signals corresponding to reference ones of said sub-channels, said reference sub-channels being one or more of (a) sub-channels bearing no transmitted data, (b) sub-channels having a fixed content which can be subtracted to obtain an interference estimate and (c) sub-channels having a content which can be estimated and subtracted to obtain an interference estimate;
    subtracting the interference estimates from the respective component signals to produce adjusted component signals, wherein for any particular sub-channel the interference estimate therefor is calculated as a weighted sum of interference content of the component signals of some of said reference sub-channels (excluding the particular sub-channel for which the interference estimate is to be used); and selecting weights for said weighted sums by defining an assumed interfering signal, determining the sub-channel components that would be received if the received signals were to consist of the assumed interfering signal alone, and adjusting the weights for said particular sub-channel such as to tend to reduce the magnitude of a difference between the sub-channel component in the respective sub-channel and the weighted sum of said determined sub-channel components due to the assumed interfering signal.

14. A method according to claim 13 in which the assumed interfering signal is a white noise signal occupying one or more defined portions of said frequency spectrum.

15. A method according to claim 14 including receiving signals identifying one or more idle sub-channels, and defining the or each defined portion of spectrum as lying within a frequency range corresponding to an idle sub-channel or to a plurality of adjacent idle sub-channels.

16. A method according to claim 13 in which the weights are selected once.

17. A method according to claim 13 in which the weights are reselected following a change in selection of the reference sub-channels.

18. A method according to claim 13 including receiving signals identifying idle sub-channels, the interference content of the sub-channel being the component signal for that sub-channel.

19. A method according to claim 13 including receiving signals identifying sub-channels containing known signals, and determining the interference content of the sub-channel by subtracting said known content from the component signal for that sub-channel.

20. A method according to claim 13 for use with transmissions in which the signals in the sub-channels are allowed to assume only certain permitted values, the method including estimating, for from the component signal for a given sub-channel, which of the permitted values it represents, and determining the interference content of the sub-channel by subtracting said estimated permitted value from the component signal for that sub-channel.

21. A receiver for signals comprising a plurality of sub-channels occupying different but mutually overlapping portions of frequency spectrum, comprising:

means for separating the signals into component signals corresponding to the respective sub-channels;

means for calculating interference estimates for at least some of said sub-channels based on the component signals corresponding to reference ones of said sub-channels, said reference sub-channels being one or more of (a) sub-channels bearing no transmitted data, (b) sub-channels having a fixed content which can be subtracted to obtain an interference estimate and (c) sub-channels having a content which can be estimated and subtracted to obtain an interference estimate;

means for subtracting the interference estimates from the respective component signals to produce adjusted component signals;

wherein the calculating means is operable for any particular sub-channel to calculate the interference estimate therefor as a weighted sum of interference content of the component signals of some of said reference sub-channels (excluding the particular sub-channel for which the interference estimate is to be used); and means for selecting the weights for said weighted sums by defining an assumed interfering signal, determining the sub-channel components that would be received if the received signals were to consist of the assumed interfering signal alone, and adjusting the weights for said particular sub-channel such as to tend to reduce the magnitude of a difference between the sub-channel component in the respective sub-channel and the weighted sum of said determined sub-channel components due to the assumed interfering signal.

22. A receiver according to claim 21 in which the assumed interfering signal is a white noise signal occupying one or more defined portions of said frequency spectrum.

23. A receiver according to claim 22 including means for receiving signals identifying one or more idle sub-channels, and defining the or each defined portion of spectrum as lying within a frequency range corresponding to an idle sub-channel or to a plurality of adjacent idle sub-channels.

24. A receiver according to claim 21 in which the means for selecting the weights is operable to reselect the weights following a change in selection of the reference sub-channels.

25. A receiver according to claim 21 including means receiving signals identifying idle sub-channels, the interference content of the sub-channel being the component signal for that sub-channel.

26. A receiver according to claim 21 including means receiving signals identifying sub-channels containing known signals, and for determining the interference content of the sub-channel by subtracting said known content from the component signal for that sub-channel.

27. A receiver according to claim 21 for use with transmissions in which the signals in the sub-channels are allowed to assume only certain permitted values, and including means for estimating, for from the component signal for a given sub-channel, which of the permitted values it represents, and determining the interference content of the sub-channel by subtracting said estimated permitted value from the component signal for that sub-channel.

28. A method of receiving signals comprising a plurality of sub-channels occupying different but mutually overlapping portions of frequency spectrum, comprising:

separating the signals into component signals corresponding to the respective sub-channels;

calculating interference estimates for at least some of said sub-channels, based on the component signals corresponding to reference ones of said sub-channels;

subtracting the interference estimates from the respective component signals;

wherein the calculation comprises defining at least one parameter of an assumed interfering signal;

selecting a value for the parameter(s) such as to tend to reduce a difference between an expected interference in each reference sub-channel due to the assumed interfering signal and interference content of the component signal for that reference sub-channel; and calculating said interference estimates as a function of the selected parameter(s);

including receiving signals identifying sub-channels containing known signals, and determining the interference content of the sub-channel by subtracting said known content from the component signal for that sub-channel.

29. A method according to claim 28 for use with transmissions in which the signals in the sub-channels are allowed to assume only certain permitted values, the method including estimating, for from the component signal for a given sub-channel, which of the permitted values it represents, and determining the interference content of the sub-channel by subtracting said estimated permitted value from the component signal for that sub-channel.

30. A method of receiving signals comprising a plurality of sub-channels occupying different but mutually overlapping portions of frequency spectrum, comprising:
separating the signals into component signals corresponding to the respective sub-channels;
calculating interference estimates for at least some of said sub-channels, based on the component signals corresponding to reference ones of said sub-channels;
subtracting the interference estimates from the respective component signals;
wherein the calculation comprises
defining at least one parameter of an assumed interfering signal;
selecting a value for the parameter(s) such as to tend to reduce a difference between an expected interference in each reference sub-channel due to the assumed interfering signal and interference content of the component signal for that reference sub-channel; and
calculating said interference estimates as a function of the selected parameter(s); wherein, for use with transmissions in which the signals in the sub-channels are allowed to assume only certain permitted values, the method includes estimating, for from the component signal for a given sub-channel, which of the permitted values it represents, and determining the interference content of the sub-channel by subtracting said estimated permitted value from the component signal for that sub-channel.

31. A receiver for signals comprising a plurality of sub-channels occupying different but mutually overlapping portions of frequency spectrum, comprising:
means for separating the signals into component signals corresponding to the respective sub-channels;
means for calculating interference estimates for at least some of said sub-channels, based on the component signals corresponding to reference ones of said sub-channels;
means for subtracting the interference estimates from the respective component signals;
wherein the calculating means is operable to
define at least one parameter of an assumed interfering signal;
select a value for the parameter(s) such as to tend to reduce a difference between an expected interference in each reference sub-channel due to the assumed interfering signal and interference content of the component signal for that reference sub-channel; and
calculate said interference estimates as a function of the selected parameter(s);
the receiver further including means receiving signals identifying sub-channels containing known signals, and for determining the interference content of the sub-channel by subtracting said known content from the component signal for that sub-channel.

32. A receiver according to claim 31 for use with transmissions in which the signals in the sub-channels are allowed to assume only certain permitted values, and including means for estimating, for from the component signal for a given sub-channel, which of the permitted values it represents, and determining the interference content of the sub-channel by subtracting said estimated permitted value from the component signal for that sub-channel.

33. A receiver for signals comprising a plurality of sub-channels occupying different but mutually overlapping portions of frequency spectrum, comprising:
means for separating the signals into component signals corresponding to the respective sub-channels;
means for calculating interference estimates for at least some of said sub-channels, based on the component signals corresponding to reference ones of said sub-channels;
means for subtracting the interference estimates from the respective component signals;
wherein the calculating means is operable to
define at least one parameter of an assumed interfering signal;
select a value for the parameter(s) such as to tend to reduce a difference between an expected interference in each reference sub-channel due to the assumed interfering signal and interference content of the component signal for that reference sub-channel; and
calculate said interference estimates as a function of the selected parameter(s);
including, for use with transmissions in which the signals in the sub-channels are allowed to assume only certain permitted values, means for estimating, for from the component signal for a given sub-channel, which of the permitted values it represents, and determining the interference content of the sub-channel by subtracting said estimated permitted value from the component signal for that sub-channel.

* * * * *